United States Patent
Zhang et al.

(10) Patent No.: US 10,343,643 B2
(45) Date of Patent: Jul. 9, 2019

(54) AIRBAG DEPLOYMENT TRAJECTORY CONTROL MECHANISM AND METHOD

(71) Applicant: NIO NEXTEV LIMITED, Central OT (HK)

(72) Inventors: Heng Zhang, San Jose, CA (US); Jeffrey D. Rupp, San Jose, CA (US); Christopher J. Eckert, San Jose, CA (US); Yih-Charng Deng, San Jose, CA (US)

(73) Assignee: NIO NEXTEV LIMITED, Hong Kong (CN)

( * ) Notice: Subject to any disclaimer, the term of this patent is extended or adjusted under 35 U.S.C. 154(b) by 0 days.

(21) Appl. No.: 15/473,132

(22) Filed: Mar. 29, 2017

(65) Prior Publication Data

US 2018/0281739 A1 Oct. 4, 2018

(51) Int. Cl.
*B60R 21/203* (2006.01)
*B60R 21/2334* (2011.01)

(52) U.S. Cl.
CPC ........ *B60R 21/2334* (2013.01); *B60R 21/203* (2013.01)

(58) Field of Classification Search
CPC ............. B60R 21/2334; B60R 21/203; B60R 2021/23107
See application file for complete search history.

(56) References Cited

U.S. PATENT DOCUMENTS

| | | | | |
|---|---|---|---|---|
| 3,767,225 | A * | 10/1973 | Mazelsky | B60R 21/206 137/850 |
| 3,836,169 | A * | 9/1974 | Schiesterl | B60R 21/203 280/731 |
| 4,006,918 | A * | 2/1977 | MacFarland | B60R 21/233 139/389 |
| 5,265,668 | A | 11/1993 | Fisher | |
| 6,419,262 | B1 | 7/2002 | Fendt et al. | |
| 6,431,583 | B1 | 8/2002 | Schneider | |

(Continued)

FOREIGN PATENT DOCUMENTS

| | | |
|---|---|---|
| CN | 102398562 | 4/2012 |
| JP | H01-132444 | 5/1989 |

(Continued)

OTHER PUBLICATIONS

U.S. Appl. No. 15/459,980, filed Mar. 15, 2017, Stevens et al.

(Continued)

*Primary Examiner* — Drew J Brown
(74) *Attorney, Agent, or Firm* — Sheridan Ross P.C.

(57) ABSTRACT

A system and method of inflating an airbag and trajectory control tube are disclosed. The system and method include detecting application of a force at at least one of a plurality of sensors, initiating an inflation system to cause inflation of the airbag and the trajectory control tube responsive to the detecting, inflating the trajectory control tube based on the initiating, inflating the airbag, and breaching the airbag and the trajectory control tube compartment. The system and method include guiding the airbag deployment trajectory via the trajectory control tube guides the airbag deployment trajectory. The system and method include the guiding occurs as the airbag begins to inflate, as the airbag inflates, after the airbag has inflated or before the airbag inflates.

12 Claims, 6 Drawing Sheets

(56) References Cited

U.S. PATENT DOCUMENTS

| | | | |
|---|---|---|---|
| 6,962,363 B2 | 11/2005 | Wang et al. | |
| 7,070,201 B2 | 7/2006 | Song et al. | |
| 8,480,122 B2* | 7/2013 | Ohara | B60R 21/205 |
| | | | 280/729 |
| 8,820,778 B2 | 9/2014 | Fukawatase | |
| 9,248,799 B2 | 2/2016 | Schneider et al. | |
| 9,409,538 B2 | 8/2016 | Gorman et al. | |
| 9,676,362 B1* | 6/2017 | Deng | B60R 21/233 |
| 9,771,050 B1* | 9/2017 | Jamison | B60R 21/2346 |
| 9,902,360 B2* | 2/2018 | Park | B60R 21/2035 |
| 2001/0007391 A1* | 7/2001 | Hamada | B60R 21/2171 |
| | | | 280/743.2 |
| 2003/0001366 A1 | 1/2003 | Debler et al. | |
| 2004/0104563 A1 | 6/2004 | Fischer | |
| 2006/0006631 A1 | 1/2006 | Meissner et al. | |
| 2007/0262570 A1 | 11/2007 | Choi | |
| 2013/0307254 A1* | 11/2013 | Yamaji | B60R 21/233 |
| | | | 280/729 |
| 2014/0375032 A1 | 12/2014 | Fukawatase et al. | |
| 2015/0137489 A1* | 5/2015 | Vinton | B60R 21/2346 |
| | | | 280/728.2 |
| 2016/0121840 A1* | 5/2016 | Iida | B60R 21/201 |
| | | | 280/728.2 |

FOREIGN PATENT DOCUMENTS

| | | |
|---|---|---|
| JP | 05-254381 | 10/1993 |
| JP | H11-245759 | 9/1999 |
| JP | 2002-362274 | 12/2002 |
| JP | 2013-103661 | 5/2013 |
| JP | 2014-159254 | 9/2014 |
| WO | WO 2007/078500 | 7/2007 |

OTHER PUBLICATIONS

U.S. Appl. No. 15/806,624, filed Nov. 8, 2017, Rupp et al.
U.S. Appl. No. 15/703,422, filed Sep. 13, 2017, Rupp.
U.S. Appl. No. 15/473,145, filed Mar. 29, 2017, Zhang et al.
Official Action for U.S. Appl. No. 15/459,980, dated Sep. 6, 2017, 6 pages.
Notice of Allowance for U.S. Appl. No. 15/459,980, dated Mar. 28, 2018, 7 pages.
Official Action for U.S. Appl. No. 15/473,145, dated Jul. 2, 2018, 6 pages.
International Search Report and Written Opinion for International (PCT) Patent Application No. PCT/IB2018/001554, dated Apr. 28, 2019 9 pages.

* cited by examiner

AIRBAG DEPLOYMENT TRAJECTORY CONTROL MECHANISM AND METHOD

FIELD OF INVENTION

The present invention is related to airbag deployment and particularly to the control of the trajectory of airbag deployment.

BACKGROUND

Airbag deployment trajectory is an important consideration in airbag restraint system design. Good deployment trajectory may enhance protection for occupants and avoid inflation induced injuries to out-of-position (OOP) occupants. In the past, the restraint system suppliers have used airbag shape and the assembly of fabric pieces, tethers inside the airbag, airbag folding pattern, and inflator nozzle orientation to attempt to control airbag deployment trajectory. The old methods have required trial-and-error techniques and can provide less than optimal outcomes. Therefore, a need exists to improve the control the trajectory of airbags during deployment in order to protect occupants and reduce injuries to OOPs.

SUMMARY

A system and method of inflating an airbag and trajectory control tube are disclosed. The system and method include detecting application of a force at at least one of a plurality of sensors, initiating an inflation system to cause inflation of the airbag and the trajectory control tube responsive to the detecting, inflating the trajectory control tube based on the initiating, inflating the airbag, and breaching the airbag and the trajectory control tube compartment. The system and method include guiding the airbag deployment trajectory via the trajectory control tube. The system and method include the guiding that occurs as the airbag begins to inflate, as the airbag inflates, after the airbag has inflated or before the airbag inflates.

A passive restraint system is also disclosed. The passive restraint system includes an airbag that is capable of deploying upon impact to restrain the body of at least one occupant and at least one trajectory control tube adhered to the airbag, the at least one trajectory control tube capable of guiding the airbag deployment trajectory. The passive restraint system includes the guiding that occurs as the airbag begins to deploy, as the airbag deploys, after the airbag has deployed or before the airbag deploys.

An automobile including a passive restraint system is also disclosed. The automobile includes an airbag that is capable of deploying upon impact to restrain the body of at least one occupant and at least one trajectory control tube adhered to the airbag, the at least one trajectory control tube capable of guiding the airbag deployment trajectory. The automobile includes the guiding that occurs as the airbag begins to deploy, as the airbag deploys, after the airbag has deployed or before the airbag deploys.

BRIEF DESCRIPTION OF THE DRAWINGS

A more detailed understanding can be had from the following description, given by way of example in conjunction with the accompanying drawings wherein.

DETAILED DESCRIPTION

Figure 1:
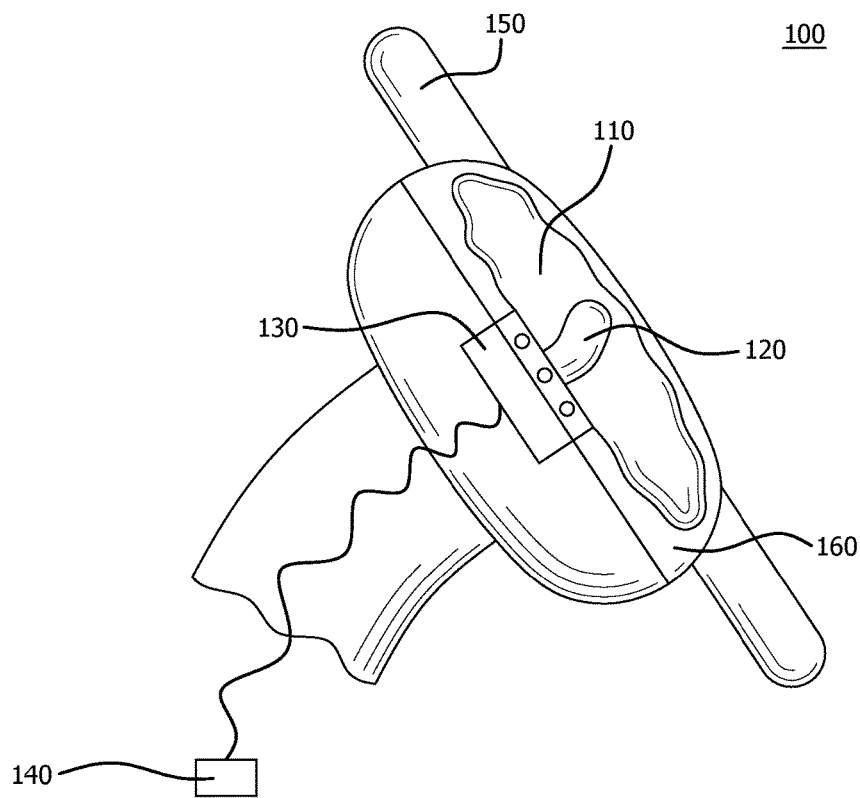
FIG. 1 illustrates an airbag and associated inflation device depicted in an uninflated state.

FIG. 1 illustrates an airbag and associated inflation device depicted in an uninflated state 100. Airbag and associated inflation device 100 includes an airbag 110, a trajectory control tube 120, an inflation system 130, a sensor or plurality of sensors 140. As shown in FIG. 1, airbag and associated inflation system 100 is depicted within a steering wheel assembly including a steering wheel 150 and a steering wheel compartment 160. While shown within the steering wheel, airbag and associated inflation device 100 may be located in a myriad of different locations as would understood to those possessing an ordinary skill in the pertinent arts, and as will be set forth herein below.

In an implementation airbag 110 is made of thin, nylon fabric and folded into steering wheel compartment 160 or other compartment in the vehicle. As is known to those possessing an ordinary skill in the art, airbag 110 may be part of a passive vehicle restraint system within a vehicle, the airbag 110 designed to rapidly inflate on impact to restrain the body of an occupant or occupants, often above torso level, to prevent direct contact with the vehicle structure.

Airbag 110 may have associated therewith a trajectory control tube 120. Trajectory control tube 120 may also be made of thin, nylon fabric. Trajectory control tube 120 may be included within airbag 110 (as shown) or may be adjacent to airbag 110. Airbag 110 and trajectory control tube 120 may be inflated by inflation system 130. As shown a single inflation system 130 may be used for the inflation of both airbag 110 and trajectory control tube 120, although multiple inflation systems 130 may be used for inflation of airbag 110 and/or trajectory control tube 120. While a single trajectory control tube 120 and/or airbag 110 is discussed in the examples below, the present invention encompasses the use of multiple trajectory control tubes 120 and/or multiple airbags 110.

Inflation system 130 may include an inflator mechanism, such as a chemical reaction to produce a large pulse of gas. This gas inflates airbag 110 and trajectory control tube 120 causing airbag 110 and trajectory control tube 120 to burst out of steering wheel compartment 160 or other compartment as airbag 110 and trajectory control tube 120 expand. The breaching of steering wheel compartment 160 may be caused by the inflation trajectory control tube 120 without any inflation of airbag 110, by the inflation of airbag 110 without any inflation of the trajectory control tube 120, or may be caused by a combination of the inflation of trajectory control tube 120 and airbag 110 with any combination between the trajectory control tube 120 and airbag 110. Airbag 110 and trajectory control tube 120 are deflated as appropriate during the energy absorption phase of interaction with the vehicle occupant.

Inflation system 130 may be controlled or initiated by a single or series of signals from a sensor or plurality of sensors 140. Sensors 140 may detect an impact or deceleration of the vehicle and provide a signal to inflation system 130 to initiate inflation of airbag 110 and trajectory control tube 130. Sensors 140 send an electric signal to inflation system 130 to fill airbag 110 and trajectory control tube 120. Sensors 140 may be located throughout the vehicle, generally at the periphery of the vehicle, such as in the doors, and in the center of the vehicle in the front and back.

Figure 2:
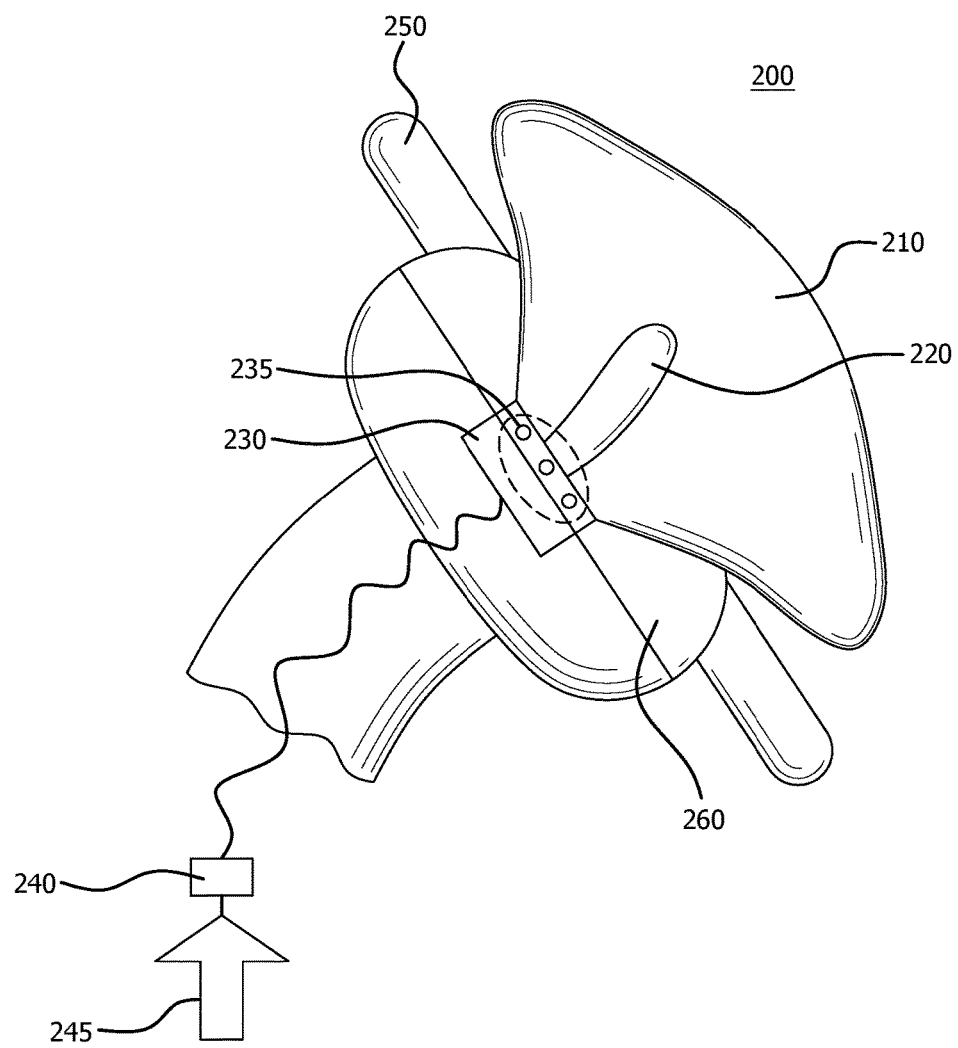
FIG. 2 illustrates an airbag and associated inflation device depicted in an inflated state.

FIG. 2 illustrates an airbag and associated inflation device depicted in an inflated state 200. While FIG. 2 is representation of an airbag and inflation device, FIG. 2 provides illustration of the parts of the present invention and is not intended to provide an actual depiction of the shape or configuration of an actual inflated airbag.

Airbag and associated inflation device 200 is a depiction of the inflated state of the airbag and associated inflation device 100 of FIG. 1. Airbag and associated inflation device 200 includes an airbag 210, a trajectory control tube 220, an inflation system 230, a sensor or plurality of sensors 240. As shown in FIG. 2, airbag and associated inflation system 200 is depicted within a steering wheel assembly including a steering wheel 250 and a steering wheel compartment 260.

Upon application of a force 245, or otherwise initiating sensor 240 a signal is provided to inflation system 230 causing initiation of inflation 235. This inflation results in airbag 210 and trajectory control tube 220 inflating and breaching compartment 260.

Figure 3:
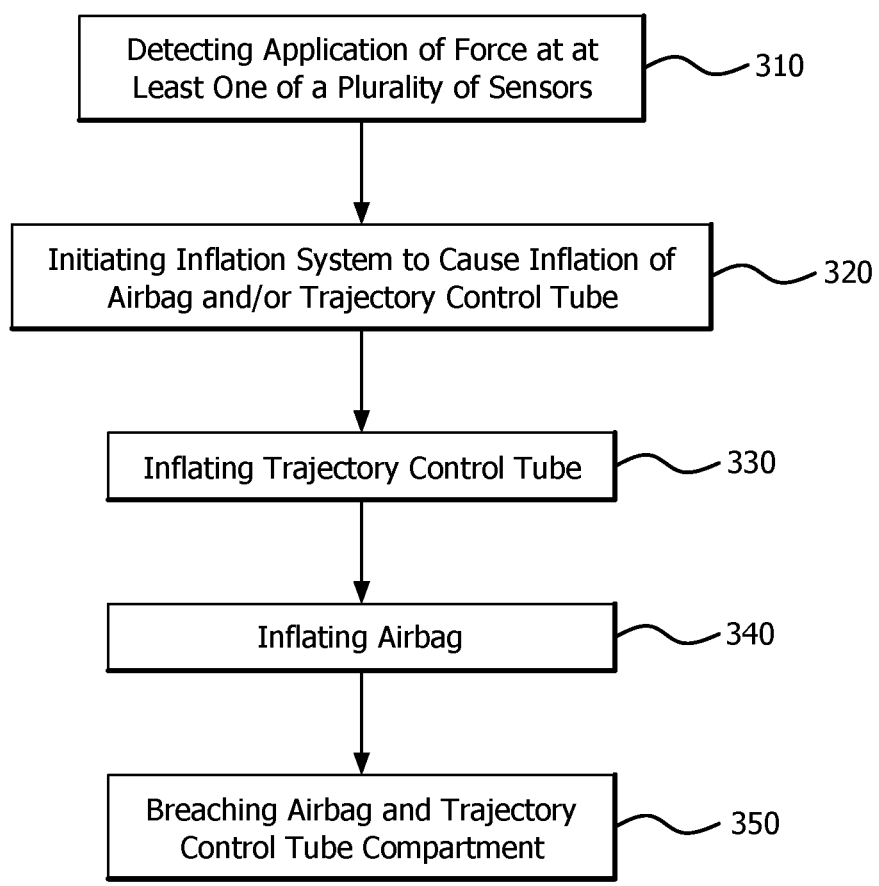
FIG. 3 illustrates a method of inflating an airbag and trajectory control tube.

FIG. 3 illustrates a method of inflating an airbag and trajectory control tube 300. Method 300 includes detecting application of a force at at least one of a plurality of sensors at step 310. At step 320, method 300 includes initiating the inflation system to cause inflation of airbag and trajectory control tube. At step 330, method 300 includes inflating the trajectory control tube. Inflating the trajectory control tube guides the airbag deployment trajectory as the airbag begins, or continues to inflate at step 330. Method 300 includes inflating the airbag at step 330 and breaching the airbag and trajectory control tube compartment at step 350.

As set forth, inflating the trajectory control tube guides the airbag deployment trajectory. This guiding may occur before the airbag inflates, as the airbag begins to inflate, as the airbag inflates, and/or after the airbag has inflated.

Figure 4:
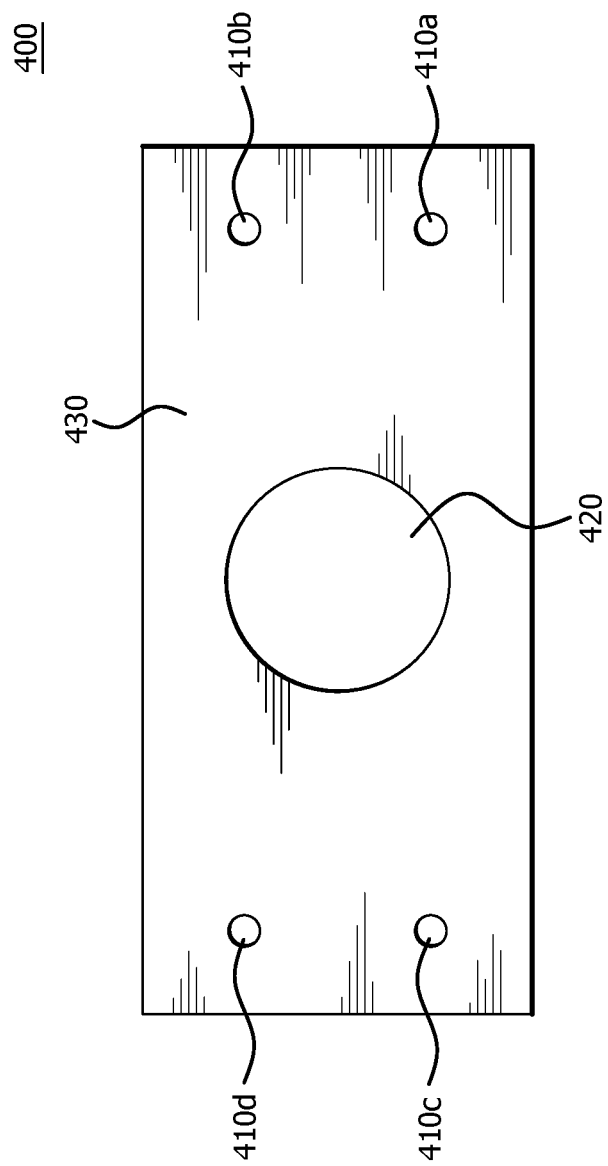
FIG. 4 illustrates a diffuser plate that may be used to control the flow of gas into the airbag and trajectory control tube.

By way of example, in an implementation illustrated in FIG. 4 a diffuser plate 400 that may be used to control the flow of gas into the airbag and trajectory control tube. The diffuser plate 400 may include a main body 430 that mounts the diffuser plate 400 to the airbag (not shown) and the trajectory control tube (not shown). A series of holes 410*a, b, c, d* may be provided allowing the gas contained on one side of the diffuser plate 400 to expand and inflate the airbag. A second series of holes 420 (shown as only a single larger hole in the depiction) may be used to direct the expanding gas into the trajectory control tube. The ratio of the area of the airbag holes 410*a, b, c, d* and the trajectory control tube holes 420 may be used to control the respective rates of inflation of the airbag and trajectory control tube to allow the trajectory control tube to inflate more quickly than the airbag to provide the guiding forces to position the airbag as desired during and for inflation. Other mechanisms for controlling the inflation of the trajectory control tube and airbag may be used while the implementation of FIG. 4 illustrates only one way of performing the inflation by example only. These other mechanisms include having separate inflators for each, for example.

By way of non-limiting example only, other mechanisms may employ a tear seam in the trajectory control tube. The trajectory control tube seam may be configured such that during initial inflation all, or the majority, of the gas is directed into the trajectory control tube causing the trajectory control tube to become completely filled. Once the trajectory control tube becomes filled and the pressure in the tube reaches a certain level, the trajectory control tube seam tears open and allows gas from the trajectory control tube to then proceed into the main airbag. Any continual gas filling the trajectory control tube at this point may proceed into the main airbag.

While a tear seam is described above, other forms of pressure relief may be used. This pressure relief may include a device or devices that react to the pressure, or a switchable device that is triggered at the appropriate time, allowing the trajectory control tube to open as if the seam is there. This opening may include a valve or something similar that opens and allows gas to flow into the main airbag.

These examples may be employed in the present system to cause the trajectory control tube to inflate ahead of the main airbag, for example. The air flow may also be controlled allowing the airbag to begin inflating while the trajectory control tube is inflated. The timing may be controlled such that the trajectory control tube fills ahead of the main airbag, in conjunction with the main airbag, or even after the main airbag for example.

Figure 5:
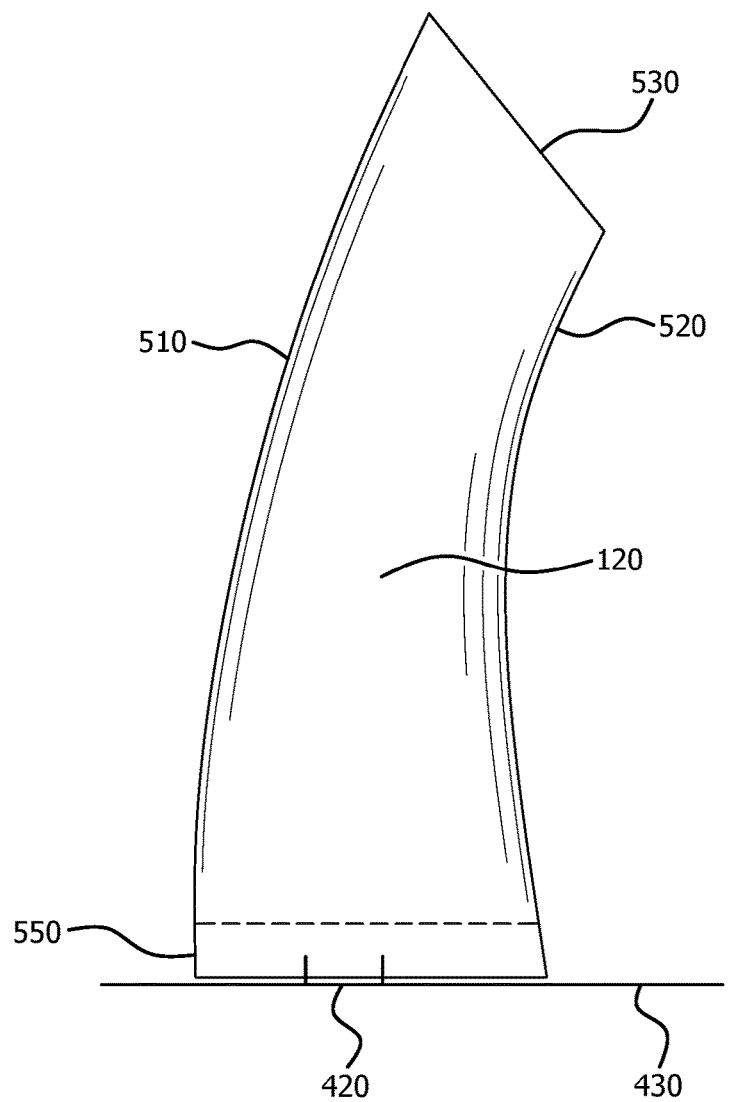
FIG. 5 illustrates an exemplary trajectory control tube.

FIG. 5 illustrates an exemplary trajectory control tube 120. Trajectory control tube 120 may be condensed into a non-filled tube depicted as non-filled tube 550. One end of trajectory control tube 120 may be coupled to the main body 430 of diffuser plate 400 and may be filled upon activation of the gas via an opening, hole or series of holes 420.

Upon application of gas, non-filled tube 550 becomes filled with gas via hole 420 and expands from the non-filled state to take the shape defined by the materials and geometry of the trajectory control tube 120. This may include a first side 510 of trajectory control tube 120 and a second side 520 of trajectory control tube 120 illustrated in the two-dimensional depiction of FIG. 5. Once inflated with gas, trajectory control tube 120 defines the location of the distal end 530 of trajectory control tube 120. The distal end 530 defines a point or plane in space distal to the diffuser plate 400 base on the specific geometry of the design of trajectory control tube 120). The placement of distal end 530 defines the guiding that trajectory control tube 120 performs in locating the airbag (not shown). That is, the airbag may be adhered to trajectory control tube 120 via end 530 to locate a portion of the airbag at the same point as end 530. Since distal end 530 may be positioned by controlling the geometric parameters of trajectory control tube 120, the portion of the airbag adhered to distal end 530 is also similarly located, thereby defining the position of the airbag. The airbag and trajectory control tube may be adhered by being sewn together, glued together, or alternatively the airbag may have a chute in which the trajectory control tube resides.

Alternatively, or additionally, there also may be no physical attachment between the trajectory control tube 120 and the airbag 110. The present invention may be designed to be achieved through friction/sliding interaction between, or among, the trajectory control tube and airbag. The use of friction may be beneficial when the main airbag is folded within the chamber and the trajectory control tube pushes against different areas of the main airbag as it unfolds.

Figure 6:
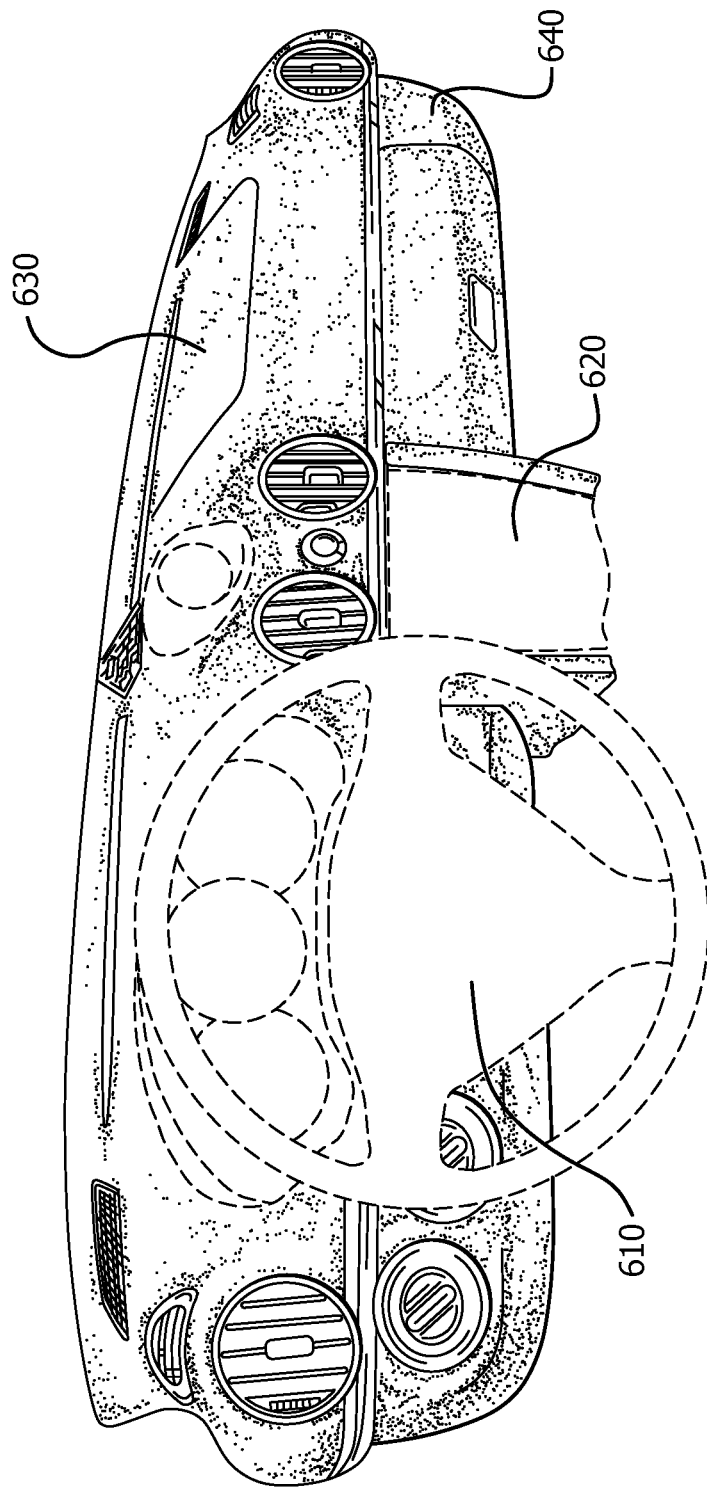
FIG. 6 illustrates a dashboard of a vehicle to provide areas where the present trajectory control tube may be implemented.

FIG. 6 illustrates a dashboard of a vehicle to provide areas where the present trajectory control tube may be implemented. By way of non-limiting example only, the present trajectory control tube and airbag may be deployed in the steering wheel 610, above center on the dashboard 620, in the center console 620, and below center on the dashboard 640. The airbag may also be located within the ceiling of the vehicle (not shown), the door of the vehicle (not shown), the seat where the airbag is deployed to protect the occupant seated in the seat (not shown) and/or the seat where the airbag is deployed to protect the occupant seated behind the seat (not shown). The trajectory control tube described above may be utilized to control the direction and placement of the airbag once deployed.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A passive restraint system, the system comprising:
    an airbag that is capable of deploying upon impact to restrain a body of at least one occupant;
    at least one trajectory control tube adhered to the airbag, the at least one trajectory control tube capable of guiding a deployment trajectory of the airbag;
    a compartment that initially houses the airbag and the at least one trajectory control tube, wherein the compartment is configured to be breached by inflation of the at least one trajectory control tube and/or inflation of the airbag; and
    a diffuser plate having a first set of holes configured to channel gas to the airbag and having a second set of holes configured to channel gas to the at least one trajectory control tube, wherein a cross-sectional area of the first set of holes is smaller than a cross-sectional area of the second set of holes.

2. The system of claim 1 wherein the guiding occurs as the airbag begins to deploy.

3. The system of claim 1 wherein the guiding occurs as the airbag deploys.

4. The system of claim 1 wherein the guiding occurs after the airbag has deployed.

5. The system of claim 1 wherein the guiding occurs before the airbag deploys.

6. The system of claim 1 wherein the airbag is adhered to trajectory control tube via an end of the trajectory control tube.

7. The system of claim 6 wherein the adhering defines a position of the airbag relative to the trajectory control tube.

8. The system of claim 6 wherein the adhering comprise sewing.

9. The system of claim 6 wherein the adhering comprises glue.

10. The system of claim 1 further comprising a chute within the airbag that defines a location of the trajectory control tube.

11. The system of claim 1 wherein the trajectory control tube and the airbag are located with respect to reach other via friction.

12. The system of claim 1, wherein the at least one trajectory control tube comprises a continuous surface that defines an enclosed volume.

* * * * *